(12) United States Patent
Fukuda et al.

(10) Patent No.: US 7,253,546 B2
(45) Date of Patent: Aug. 7, 2007

(54) ELECTRIC MOTOR AND ELECTRIC POWER STEERING APPARATUS EQUIPPED WITH THE MOTOR

(75) Inventors: Takeo Fukuda, Wako (JP); Hirofumi Atarashi, Wako (JP); Shigemitsu Akutsu, Wako (JP); Mitsuo Nakazumi, Wako (JP); Takashi Kuribayashi, Wako (JP); Hiroyuki Baba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 10/889,772

(22) Filed: Jul. 12, 2004

(65) Prior Publication Data

US 2005/0012421 A1     Jan. 20, 2005

(30) Foreign Application Priority Data

Jul. 14, 2003     (JP) .............................. 2003-196653

(51) Int. Cl.
*H02K 3/28* (2006.01)
*H02K 1/00* (2006.01)

(52) U.S. Cl. ...................... 310/179; 310/218; 310/254

(58) Field of Classification Search ................ 310/179, 310/254, 180, 185, 218
See application file for complete search history.

(56) References Cited

U.S. PATENT DOCUMENTS

| 4,833,355 | A  | * | 5/1989 | Kawashima ................ 310/198 |
| 6,577,030 | B2 | * | 6/2003 | Tominaga et al. ........ 310/68 B |
| 6,590,310 | B2 | * | 7/2003 | Takano ....................... 310/254 |
| 2003/0127921 | A1 | | 7/2003 | Akutsu et al. |

FOREIGN PATENT DOCUMENTS

| EP | 1 276 208 A2 | 1/2003 |
| JP | 2001-275325 | 10/2001 |

* cited by examiner

*Primary Examiner*—Tran Nguyen
(74) *Attorney, Agent, or Firm*—Hamre, Schumann, Mueller & Larson, P.C.

(57) ABSTRACT

An electric motor driven by three-phase electric power includes armature windings that are connected in series, via an armature-winding connecting line, for each of a plurality of groups of three or N circumferentially-adjoining poles to thereby provide three-phase armature windings, wherein N is an arbitrary number equal to a multiple of three. The armature-winding connecting line connects in series the adjoining armature windings in such a way as to not substantially straddle a relatively great part of the outer periphery of any of the adjoining armature windings.

6 Claims, 8 Drawing Sheets

ELECTRIC MOTOR AND ELECTRIC POWER STEERING APPARATUS EQUIPPED WITH THE MOTOR

FIELD OF THE INVENTION

The present invention relates to electric motors and electric power steering apparatus equipped with such electric motors.

BACKGROUND OF THE INVENTION

As well known, the electric power steering apparatus are steering assisting apparatus which are constructed to activate an electric motor (steering assisting motor) as a human driver manually operates a steering wheel of a motor vehicle, to thereby assist the driver's manual steering effort. In such electric power steering apparatus, the steering assisting motor, which provides steering assist force or torque, is controlled on the basis of a steering torque signal generated by a steering torque detection section detecting steering torque that is produced on the steering shaft by driver's operation of the steering wheel and a vehicle velocity signal generated by a vehicle velocity detection section detecting a traveling velocity of the vehicle, so as to reduce manual steering force to be applied by the human driver.

For example, Japanese Patent Application Laid-Open Publication No. 2001-275325 discloses an electric power steering apparatus, where the steering torque applied to the steering wheel is delivered to an output shaft of a rack and pinion mechanism while the steering assist torque produced by the electric motor in accordance with the steering torque is delivered to a pinion shaft via a frictional transmission mechanism and worm gear mechanism. Thus, road wheels of the vehicle are steered via the rack and pinion mechanism. The disclosed electric power steering apparatus is designed to: impart a good steering feel by minimizing adverse effects of steering torque variation by the motor when the vehicle should travel straight with the motor kept deactivated; and enhance the controllability of the vehicle by efficiently enhancing the output performance of the motor. For these purposes, the electric motor comprises an annular outer stator including armature windings wound on nine or N (N is an arbitrary number equal to a multiple of nine) circumferentially-arranged poles, and an inner rotor located inwardly of the outer stator and including circumferentially-arranged permanent magnets of eight poles.

In the electric motor of the disclosed electric power steering apparatus, the armature-winding connecting line, connecting in series the armature windings, comes out of one of the armature windings, then extends to the next armature winding, adjoining the one armature winding, where it arcuately extends around (i.e., substantially straddles) a considerable or relatively great part of the outer periphery of the armature winding to reach a point of the next armature winding remote from the one armature winding (rather than a point of the next armature winding close to the one armature winding), and then connects to the further next armature winding that does not adjoin the one armature winding. The extra length substantially straddling the considerable part of the outer periphery of the next armature winding as noted above would considerably increase the total length of the armature-winding connecting line. Further, in a case where the armature-winding connecting line should connect from one armature winding of a given phase to another armature winding of the same phase that is spaced from the one armature winding with other armature windings of other phases interposed therebetween, the total length, per phase, of the armature-winding connecting line would inevitably have to be increased further due to an additional length straddling parts of the armature windings of the other phases.

Figure 10:
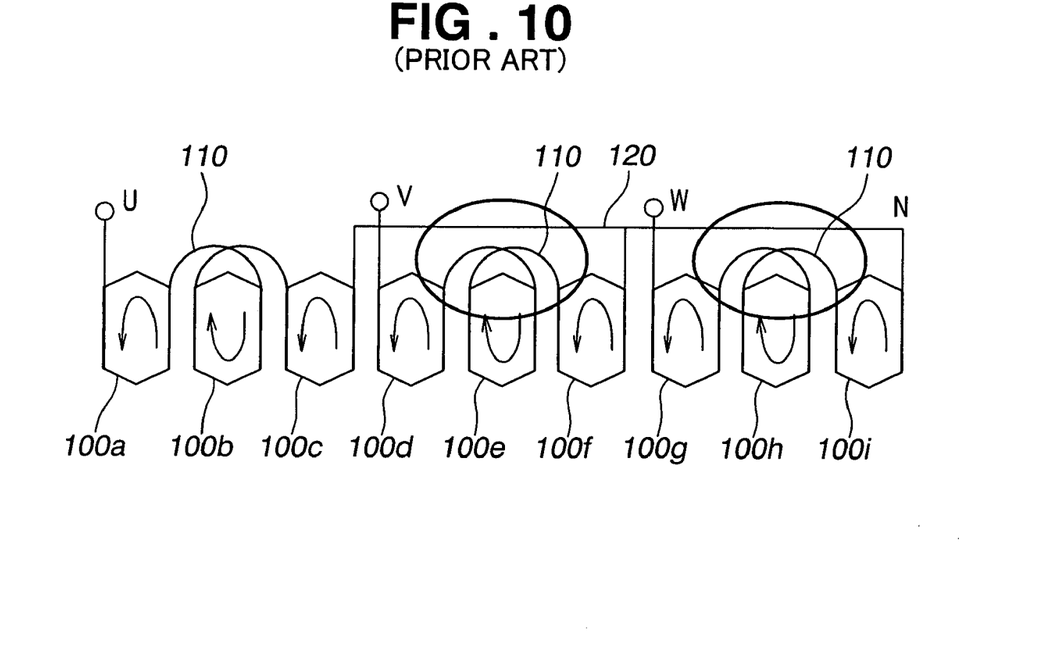
FIG. 10 is a view showing armature-winding connecting line and a neutral-point connecting line in the conventional motor.
Figure 11:
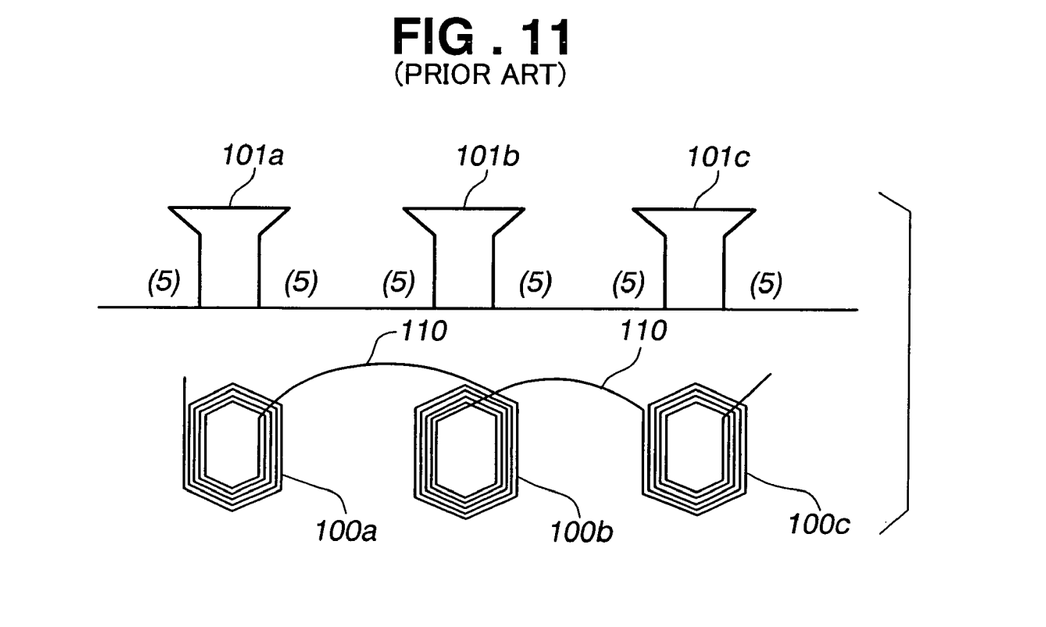
FIG. 11 is a conceptual view illustratively showing U-phase salient poles and the numbers of turns of the armature windings in the conventional motor of FIG. 10.

FIG. 10 shows an armature-winding connecting line and a neutral-point connecting line in the electric motor of the disclosed electric power steering apparatus, and FIG. 11 is a conceptual view representatively showing salient poles of one of three phases (U phase in the illustrated example) and respective numbers of turns of the armature windings 100a-100c. The armature windings 100a, 100b and 100c of adjoining three poles are connected in series to provide a U-phase winding unit, armature windings 100d, 100e and 100f of other adjoining three poles are connected in series to provide a V-phase winding unit, and the armature windings 100g, 100h and 100i of the other adjoining three poles are connected in series to provide a W-phase winding unit.

In the conventional electric motor, as shown in a plan view of FIG. 10, the armature-winding connecting line 110, connecting in series the adjoining armature windings 100a-100c, 100d-100f, 100g-100i, comes out of one of the armature windings, then arcuately extends around (i.e., substantially straddles) a considerable part of the outer periphery of the next armature winding adjoining the one armature windings, then intersects with another armature-winding connecting line 110 to connect to the further next armature winding, as depicted within an oval in the figure. Further, the neutral-point connecting line 120 is led or positioned on the same side as the armature-winding connecting lines 110, so that layout or placement of the electric motor tends to be difficult and human operators tend to confuse the armature-winding connecting lines 110 and neutral-point connecting line 120 during assembly operations.

As further illustrated in FIG. 11, the armature-winding connecting lines 110 would inevitably intersect around the middle salient pole 101b if the armature windings are to be wound to the same number of turns on the adjoining salient poles 101a-101c. In FIG. 11, the armature windings are each shown as wound to five turns on the corresponding pole, as depicted by "(5)". For the reasons stated above, there has been a demand for an improved electric motor where the armature-winding connecting lines 110 do not intersect and which has a winding structure that can be laid with increased ease and that can be reduced in size.

SUMMARY OF THE INVENTION

According to one aspect of the present invention, there is provided an improved electric motor driven by three-phase electric power, which comprises: a rotor including a rotation shaft and a plurality of permanent magnets arranged circumferentially on the outer periphery of the rotation shaft; and armature windings disposed adjacent to the outer periphery of the rotor, the armature windings being connected in series, via an armature-winding connecting line, for each of a plurality of groups of three or N circumferentially-adjoining poles, to thereby provide three-phase armature windings, wherein N is an arbitrary number equal to a multiple of three. The armature-winding connecting line, connecting in series the armature windings, is positioned so as not to arcuately extend around (or substantially straddle) a part of any of the adjoining armature windings. Preferably, the armature-winding connecting line connects the adjoining armature windings of each of the three phases on one longitudinal side of the rotation shaft.

Namely, in the motor of the present invention, the armature-winding connecting line, connecting in series the adjoining armature windings, is led in such a way as to not arcuately extend around (or substantially straddle) a part of any of the adjoining armature windings. Therefore, the armature-winding connecting line can be reduced in length and hence can have reduced electrical resistance, which should contribute to enhancement in the torque output performance of the motor.

Preferably, the electric motor of the present invention further comprises a neutral-point connecting line that connects respective neutral points of the three phases, and the armature-winding connecting line and the neutral-point connecting line are positioned on opposite longitudinal sides of the rotation shaft.

According to another aspect of the present invention, there is provided an electric power steering apparatus, which comprises: an electric motor driven by three-phase electric power to provide steering assist force to a steering system; a steering torque detection section for detecting steering torque applied to a steering wheel; and a control device for controlling the electric motor in accordance with at least a signal generated by the steering torque detection section. In the electric power steering apparatus, the electric motor comprises: a rotor including a rotation shaft and a plurality of permanent magnets arranged circumferentially on an outer periphery of the rotation shaft; and armature windings disposed adjacent to an outer periphery of the rotor, the armature windings being connected in series, via an armature-winding connecting line, for each of a plurality of groups of three or N circumferentially-adjoining poles, to thereby provide three-phase armature windings, wherein N is an arbitrary number equal to a multiple of three. The armature-winding connecting line, connecting in series the armature windings, is positioned so as not to straddle a part of any of the adjoining armature windings.

With the motor capable of achieving enhanced torque output performance, the electric power steering apparatus of the invention can impart more appropriate steering assist force and can significantly improve the steering feel.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

First, with reference to FIGS. 1 to 4, descriptions will be given about a general setup, specific mechanical and electrical arrangements and layout of electronic components of an electric power steering apparatus equipped with an electric motor of the present invention.

Figure 1:
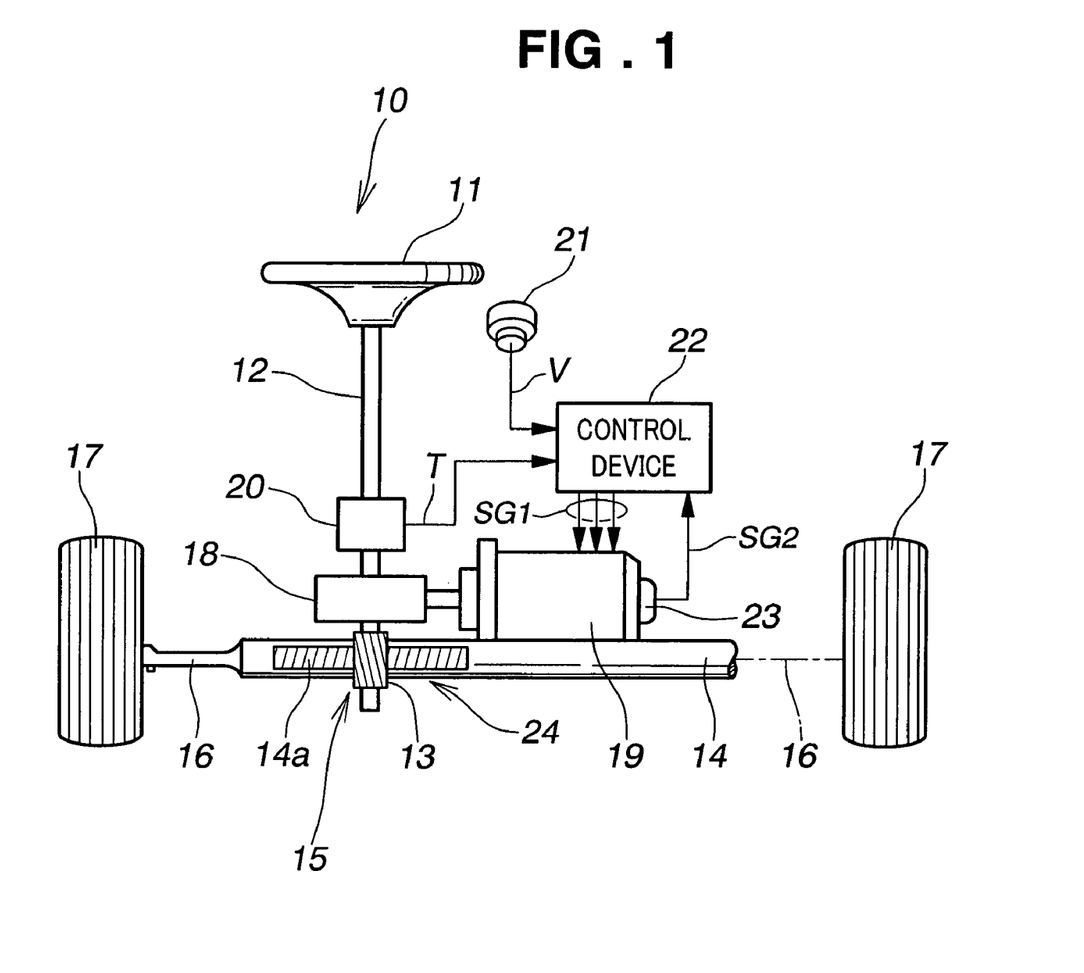
FIG. 1 is a view showing an overall setup of an electric power steering apparatus equipped with an electric motor of the present invention.

FIG. 1 is a view showing the overall setup of the electric power steering apparatus 10, which is constructed to impart steering assist force (steering assist torque) to a steering shaft 12 connected to a steering wheel 11 of a motor vehicle.

The steering shaft 12 has an upper end connected to the steering wheel 11 and a lower end connected to a pinion gear (or pinion) 13. The pinion gear 13 meshes with a rack gear 14a formed on a rack shaft 14. The pinion gear 13 and rack gear 14a together constitute a rack and pinion mechanism 15. Tie rods 16 are provided at opposite ends of the rack shaft 14, and a front road wheel 17 is connected to the outer end of each of the tie rods 16.

The electric motor 19, which is, for example, a brushless motor, generates rotational force (torque) for assisting or supplementing the steering torque, and the thus-generated rotational force is transmitted via a power transmission mechanism 18 to the steering shaft 12.

Steering torque detection section 20 is provided on the steering shaft 12. The steering torque detection section 20 detects steering torque applied by a human driver of the vehicle operating the steering wheel 11.

Reference numeral 21 represents a vehicle velocity detection section for detecting a traveling velocity of the vehicle, and 22 represents a control device implemented by a computer. On the basis of a steering torque signal T output from the steering torque detection section 20 and vehicle velocity signal V output from the vehicle velocity detection section 21, the control device 22 generates drive control signals SG1 for controlling rotation of the motor 19. Rotational angle detection section 23, which is implemented, for example, by a resolver, is attached to the motor 19. Rotational angle signal SG2 output from the rotational angle detection section 23 is fed to the control device 22. The above-mentioned rack and pinion mechanism 15 is accommodated in a gearbox 24 (FIG. 2).

As the driver operates the steering wheel 11 during travel of the vehicle, rotational force based on the steering torque applied to the steering shaft 12 is converted via the rack and pinion mechanism 15 into axial linear movement of the rack shaft 14, which, via the tie rods 16, changes a direction of the front road wheels 17. During that time, the steering torque detection section 20, attached to the steering shaft 12, detects the steering torque applied by the driver via the steering wheel 11 and converts the detected steering torque into an electrical steering torque signal T, which is then input to the control device 22. The vehicle velocity detection section 21 detects the velocity of the vehicle and converts the detected vehicle velocity into an electrical vehicle velocity signal V, which is also input to the control device 22.

The control device 22 generates motor currents Iu, Iv and Iw for driving the motor 19 on the basis of the steering torque signal T and vehicle velocity signal V. Specifically, the motor 19 is a three-phase motor driven by the A.C. motor currents Iu, Iv and Iw of three phases, i.e. U, V and W phases. Namely, the above-mentioned drive control signals SG1 are in the form of the three-phase motor currents Iu, Iv and Iw. The motor 19 is driven by such motor currents Iu, Iv and Iw to generate steering assist force (steering assist torque) that acts on the steering shaft 12 via the power transmission mechanism 18. With the electric motor 19 driven in this manner, steering force to be applied manually by the driver to the steering wheel 11 can be reduced.

Figure 2:
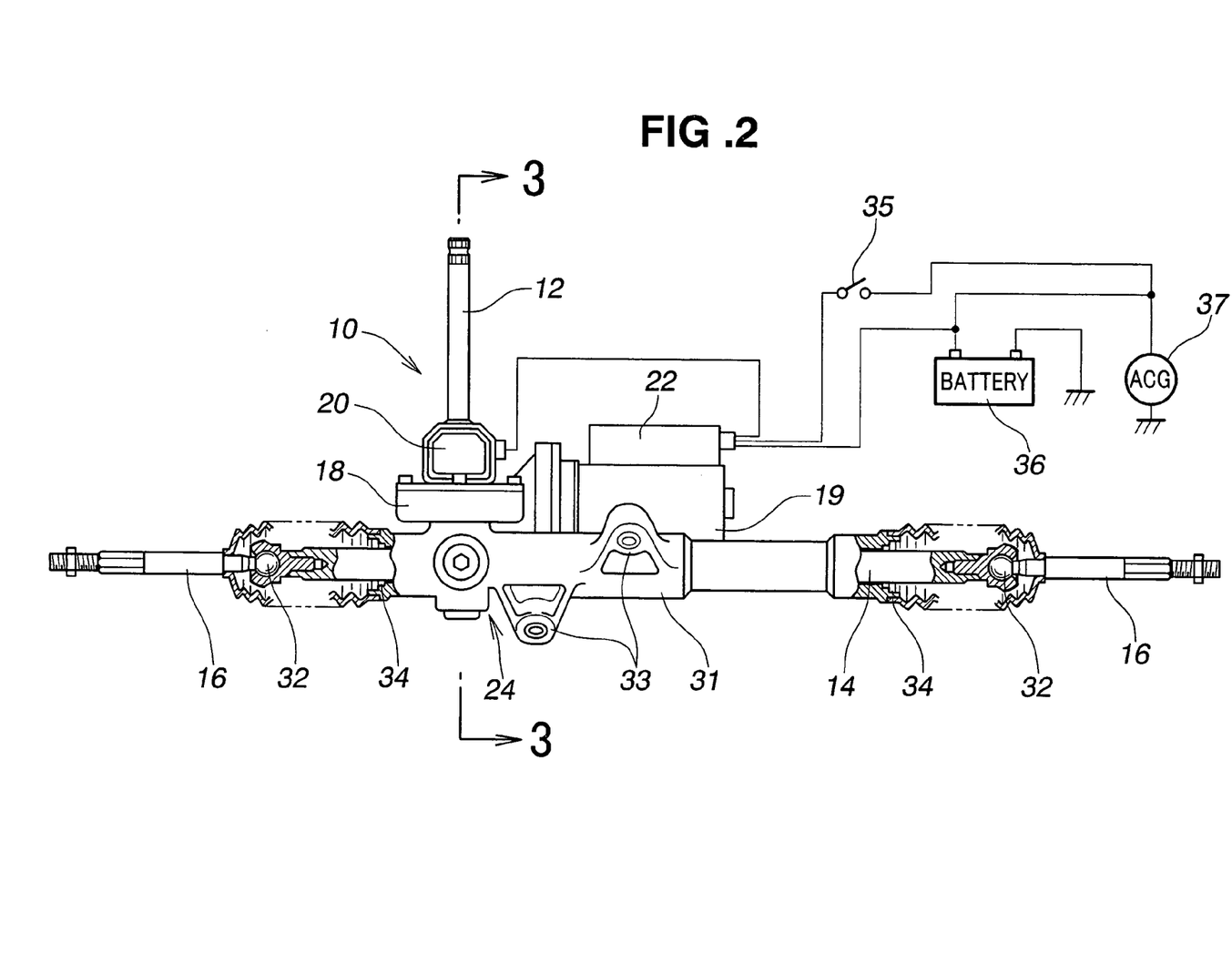
FIG. 2 is a view showing mechanical and electric arrangements of the electric power steering apparatus.

FIG. 2 is a view showing mechanical and electric arrangements of the electric power steering apparatus 10.

The rack shaft 14 is accommodated in a cylindrical housing 31 extending in a widthwise (left-and-right direction of FIG. 2) of the vehicle, and the rack shaft 14 is axially sidable within the cylindrical housing 31. Ball joints 32 are screwed onto opposite end portions of the rack shaft 14 projecting outwardly of the housing 31. The left and right tie rods 16 are coupled to the ball joints 32. The housing 31 has brackets 33 by which the housing 31 is attached to a body of the vehicle, and stoppers 34 provided on its opposite ends.

In FIG. 2, reference numeral 35 represents an ignition switch, 36 a vehicle-mounted battery, and 37 an A.C. generator (ACG) attached to an engine (not shown) of the vehicle. The vehicle engine causes the A.C. generator 37 to start generating electric power. Necessary electric power is supplied to the control device 22 from the battery 36 or A.C. generator 37. The control device 22 is attached to the motor 19.

Figure 3:
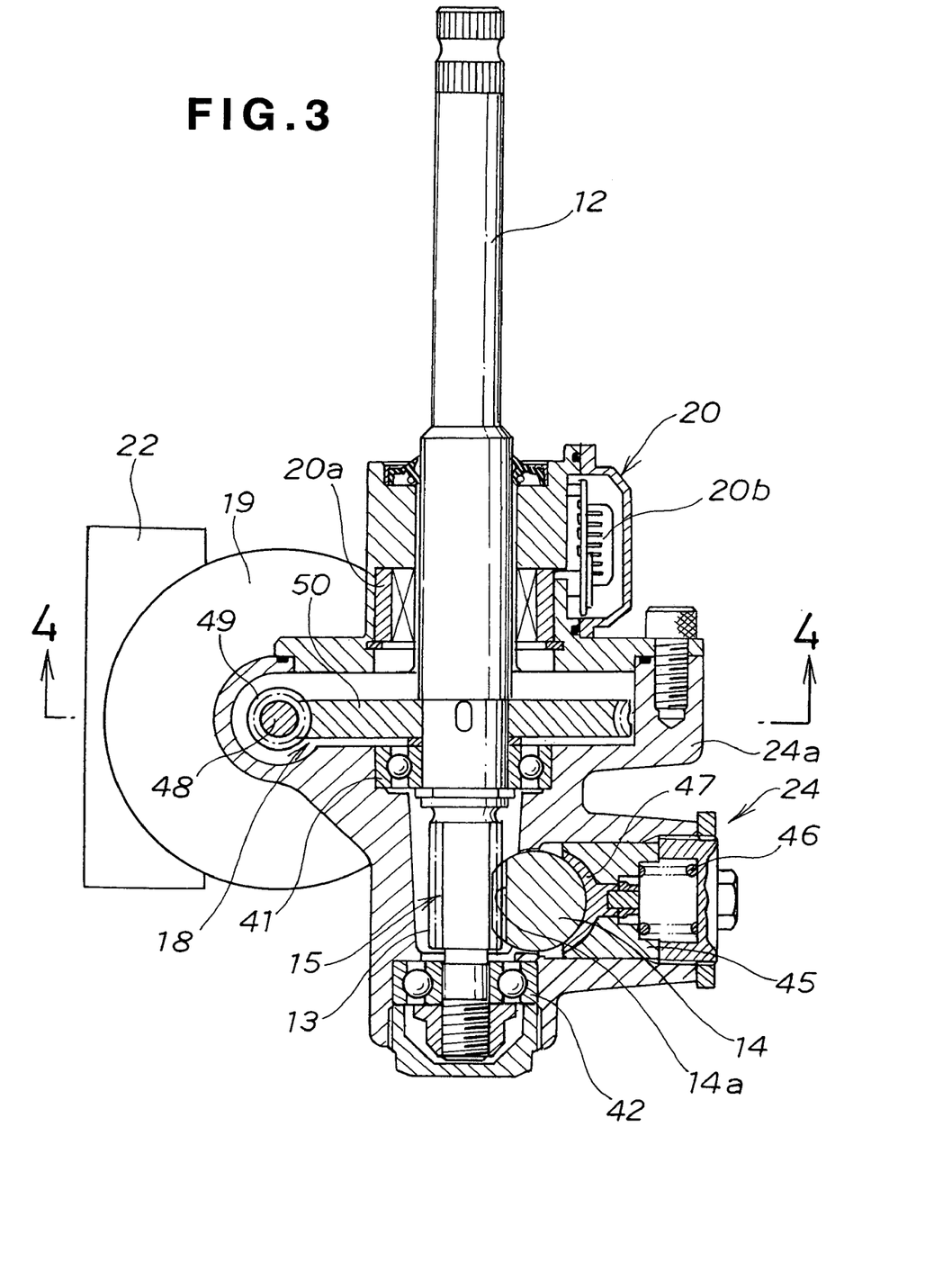
FIG. 3 is a sectional view taken along the 3-3 line of FIG. 2.

FIG. 3 is a sectional view illustratively showing specific constructions of a steering-shaft support structure, steering torque detection section 20, power transmission mechanism 18 and rack and pinion mechanism 15, as well as layout of the electric motor and control device 22.

In FIG. 3, the steering shaft 12 is rotatably supported, via two bearings 41 and 42, in a housing 24a forming the gearbox 24. The rack and pinion mechanism 15 and power transmission mechanism 18 are accommodated in the housing 24a, and the steering torque detection section 20 is attached to an upper portion of the housing 24a.

The pinion 13, provided on a lower end portion of the steering shaft 12, is located between the two bearings 41 and 42. The rack shaft 14 is guided by a rack guide 45 and normally pressed against the pinion 13 by a pressing member 47 that is in turn resiliently urged by a compression spring 46.

The power transmission mechanism 18 includes a worm gear 49 fixedly mounted on a transmission shaft 48 coupled to the output shaft of the motor 19, and a worm wheel 50 fixedly mounted on the pinion shaft 12.

The steering torque detection section 20 includes a steering torque sensor 20a positioned around the steering shaft 12, and an electronic circuit section 20b for electronically processing a steering torque detection signal output from the steering torque sensor 20a.

Figure 4:
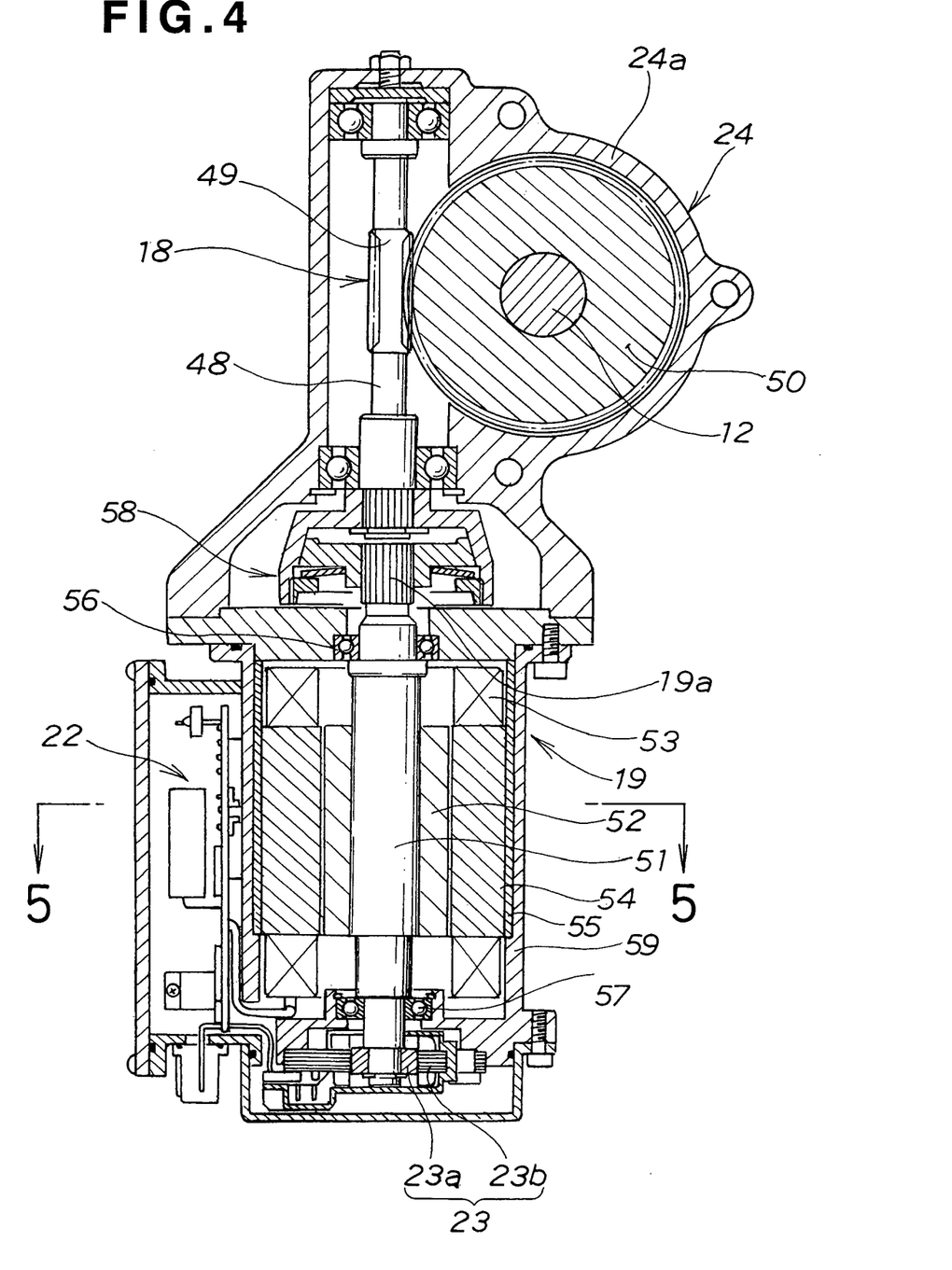
FIG. 4 is a sectional view taken along the 4-4 line of FIG. 3.

FIG. 4 shows detailed constructions of the power transmission mechanism 18 and motor 19.

The motor 19 includes an inner rotor 52 having a plurality of permanent magnets fixedly mounted on a rotation shaft 51, and annular outer stators 54 and 55 positioned adjacent to and around the outer periphery of the inner rotor 52 and having armature windings 53 wound thereon.

The rotation shaft 51 is rotatably supported via two bearings 56 and 57. One end portion of the rotation shaft 51 forms the output shaft 19a of the motor 19. The output shaft 19a of the motor 19 is coupled to the transmission shaft 48 via a torque limiter 58 so that the rotational force of the motor can be transmitted to the transmission shaft 48 via the torque limiter 58.

The worm gear 49 is fixedly mounted on the transmission shaft 48 as noted above, and the worm wheel 50 meshing with the worm gear 49 is fixedly mounted on the steering shaft 12.

The above-mentioned rotational angle detection section (rotational position detection section) 23 for detecting a rotational angle (rotational position) of the inner rotor 52 of the motor 19 is provided at a rear end portion of the rotation shaft 51. The rotational angle detection section 23 includes a rotating element 23a fixed to the rotation shaft 51, and a detecting element 23b for detecting a rotational angle of the rotating element 23a through magnetic action. For example, the rotational angle detection section 23 may comprise a resolver.

The motor currents Iu, Iv and Iw, which are three-phase A.C. currents, are supplied to the armature windings 53 of the outer stators 54 and 55. The above-mentioned components of the motor 19 are positioned within a motor case 59.

Figure 5:
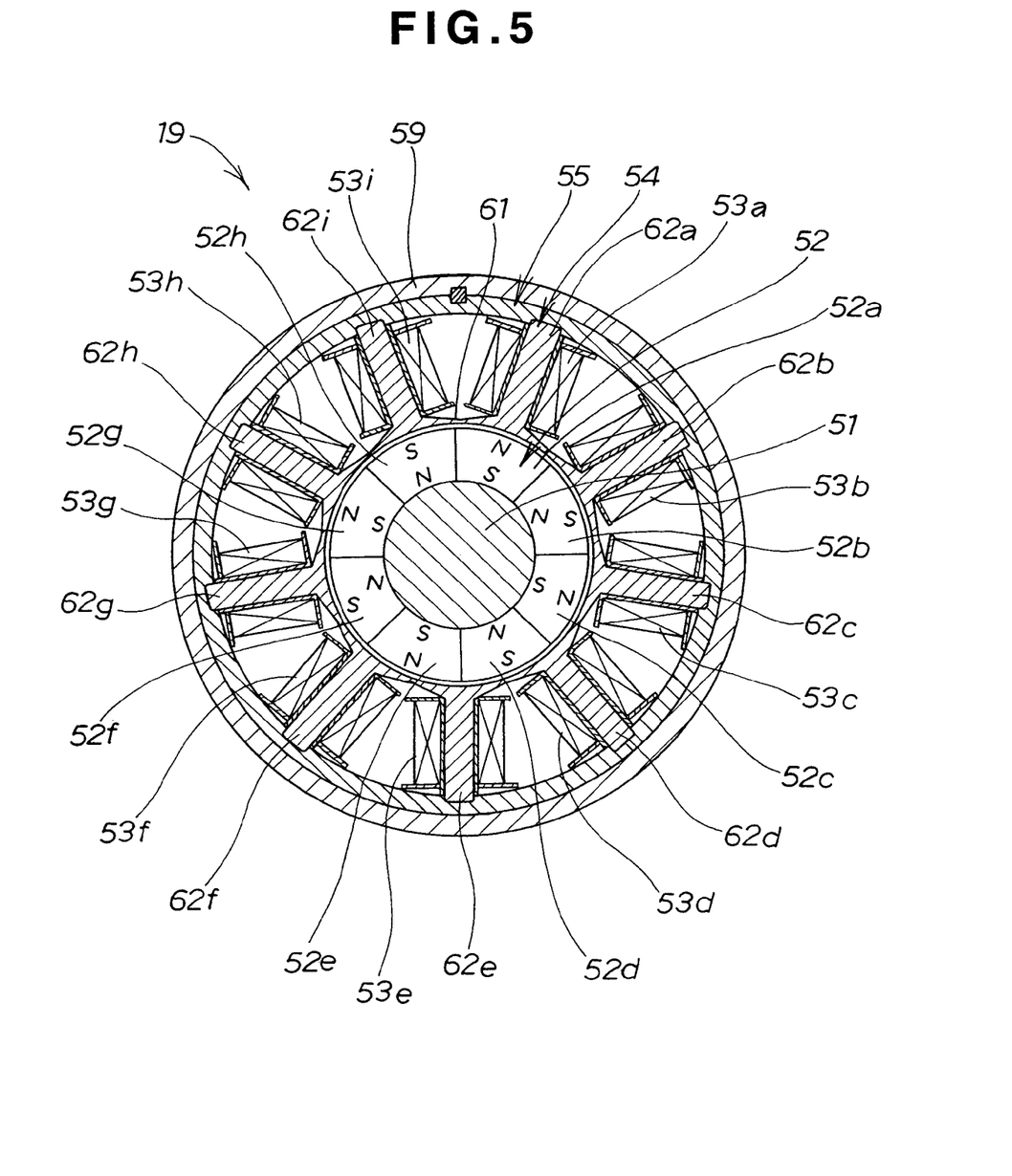
FIG. 5 is a sectional view taken along the 5-5 line of FIG. 4, which shows a sectional construction of the motor.

As illustrated in FIG. 5, which is a sectional view taken along the 5-5 line of FIG. 4 and shows a sectional construction of the motor 19, the outer stator 54 has nine salient poles 62a-62i extending radially from an outer peripheral surface of a cylindrical portion 61 at equal pitches. The armature windings 53a-53i are wound on the nine radial poles 62a-62i, to provide the U-, V- and W-phase winding units; in the illustrated example, each of the U-, V- and W-phase winding units is provided by connecting in series a different group of circumferentially-adjoining three of the poles 62a-62i.

The inner rotor 52 is a rotational member having eight permanent magnets 52a-52h arranged along a circumferential direction thereof. These eight permanent magnets 52a-52h together constitute an annular or ring-shaped member that is magnetized radially (i.e., in a direction passing through a thickness (between inner and outer surfaces) of the ring-shaped member), and the permanent magnets 52a-52h are arranged in such a manner that N and S poles alternate in the circumferential direction.

Figure 6A:
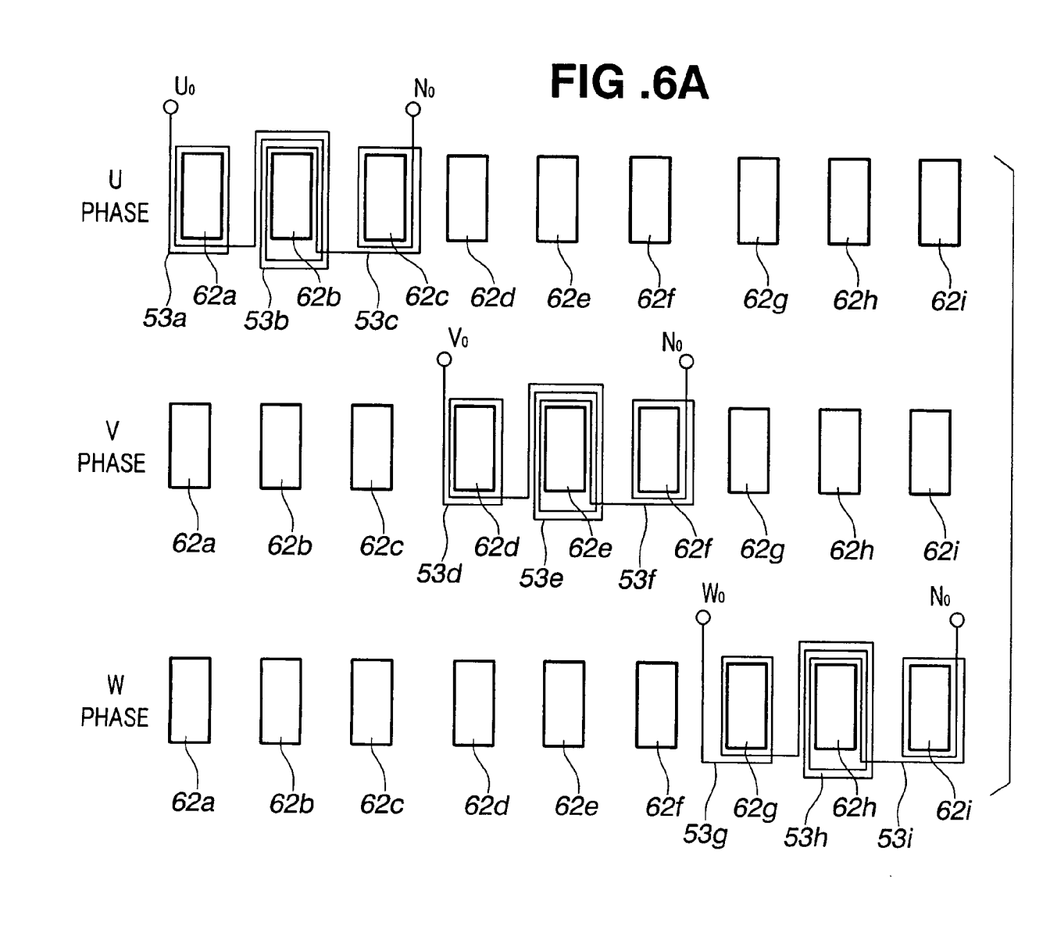
FIGS. 6A and 6B are schematic views showing armature windings in the motor of FIG. 5.
Figure 6B:
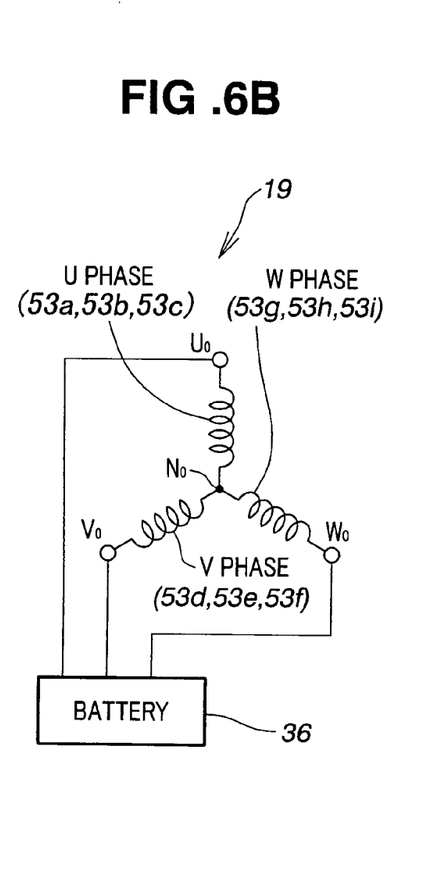

FIGS. 6A and 6B are schematic diagrams showing the armature windings of the motor 19.

Specifically, FIG. 6A shows the three-phase (U-, V- and W-phase) winding units each provided by serially connecting the armature windings 53a-53c, 53d-53f or 53g-53i wound on adjoining three of the salient poles 62a-62i. Namely, the U-phase winding unit is provided by serially connecting the armature windings 53a, 53b, 53c of first adjoining three poles 62a, 62b, 62c, the V-phase winding unit is provided by serially connecting the armature windings 53d, 53e, 53f of second adjoining three poles 62d, 62e, 62f, and the W-phase winding unit is provided by serially connecting the armature windings 53g, 53h, 53i of third adjoining three poles 62g, 62h, 62i.

As illustrated in FIG. 6B, one terminal $U_o$, $V_o$ or $W_o$ of each of the U-, V- and W-phase winding units is connected to the battery 36, while the other terminal is connected, at a neutral point $N_o$ of a reference potential, to a neutral-point connecting line Na. Wound directions of the individual armature windings 53a-53i are illustrated in FIG. 7.

Figure 7:
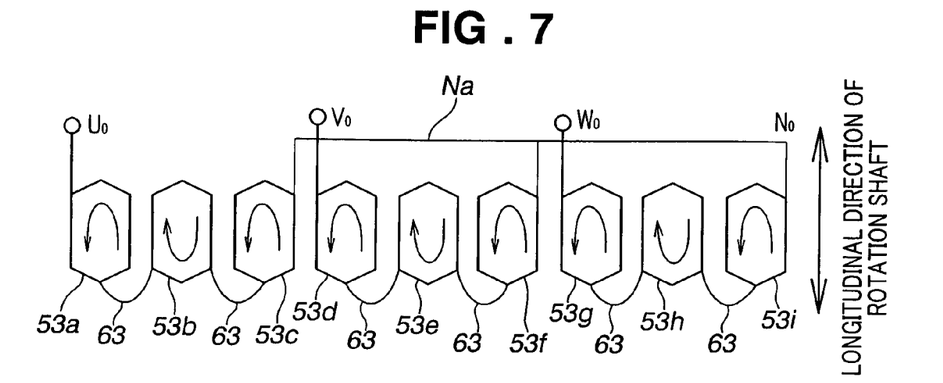
FIG. 7 is a view schematically showing respective wound directions of armature windings and a neutral-point connecting line in the motor.

Referring to FIG. 7, in the U-phase winding unit, the armature winding 53a is wound in the counterclockwise direction, the armature winding 53b in the clockwise direction, and the armature winding 53c in the counter-clockwise direction. In order to prevent an armature-winding connecting line 63, connecting between the armature windings 53a and 53b, from intersecting with the neutral-point connecting line Na near one end portion (upper end portion in the illustrated example of FIG. 7) of the armature winding 53b located on one longitudinal (axial) side (upper side in the illustrated example of FIG. 7) of the rotation shaft 51 (see FIG. 5), the armature-winding connecting line 63 is drawn out from a predetermined end portion (lower end portion in FIG. 7) of the armature winding 53a located on the other longitudinal side of the rotation shaft 51 and led to a lower end portion of the armature winding 53b. Similarly, the armature-winding connecting line 63, connecting between the armature windings 53b and 53c, is drawn out from a lower end portion of the armature winding 53b and led to a lower side of the armature winding 53c.

More specifically, the neutral-point connecting line Na, connected with the neutral points $N_o$ of the individual winding unit terminals, is led above the upper end portions of the armature windings 53a-53i, while the armature-winding connecting line 63 is led below the lower end portions of the armature windings 53a-53i. Therefore, the electric motor 19 can be placed or laid with increased ease and significantly reduced in size. Further, it is possible to reduce a possibility of human operators confusing the armature-winding connecting line 63 and neutral-point connecting line Na, since the lines 63 and Na are not located on the same side.

Figure 8:
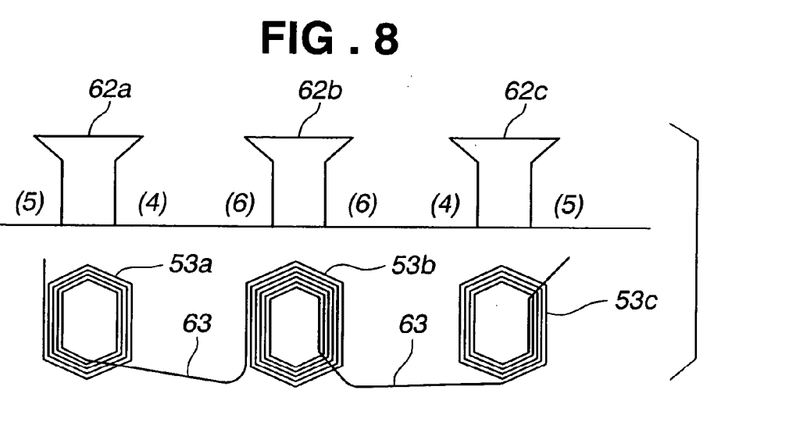
FIG. 8 is a view conceptually showing U-phase salient poles and respective numbers of turns of the armature windings shown in FIG. 7.

FIG. 8 schematically shows, by way of example, the U-phase salient poles 62a-62c and respective numbers of turns of the armature windings 53a-53c on the poles 62a-62c.

The armature windings 53a-53i are wound on the respective poles in the directions illustrated in FIG. 7. Portion of the armature winding 53a adjacent to the armature winding 53b has four turns as depicted at (4) in FIG. 8, and the armature winding 53b has six turns as depicted at (6). Portion of the armature winding 53b adjacent to the armature winding 53c has six turns as depicted at (6), and the armature winding 53c has four turns as depicted at (4). Portion of the armature winding adjacent to the winding unit of another phase has five turns as depicted at (5). Alternatively, the portion of the armature winding 53a adjacent to the armature winding 53b may have six turns, and the armature winding 53b may have four turns; in this case, the portion of the armature winding 53b adjacent to the armature winding 53c has four turns, and the armature winding 53c has six turns.

It should be understood that the numbers of turns mentioned above are just for illustrative purposes and differ from those actually employed in the motor 19.

Figure 9:
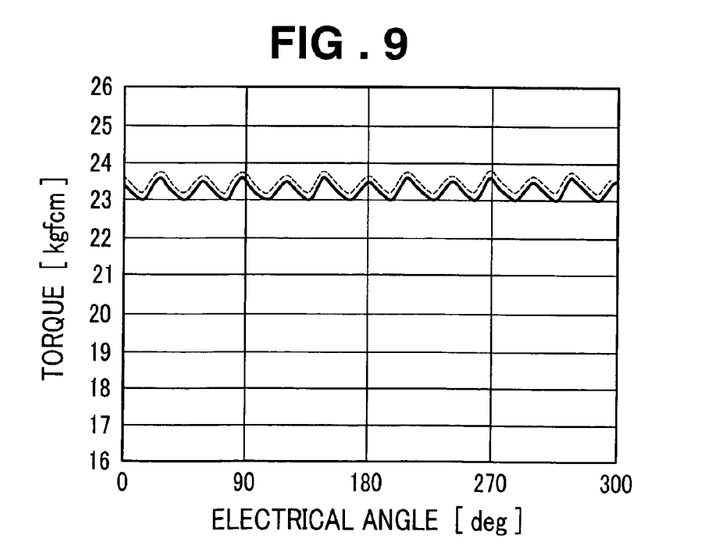
FIG. 9 is a graph comparatively showing relationship between the electrical angle and torque in the motor of the present invention and in a conventional motor.

FIG. 9 is a graph comparatively showing relationship between the electrical angle and torque in the motor 19 of the present invention and in the conventional motor. Specifically, in the figure, a solid line represents the relationship between the electrical angle and torque in the conventional motor, while a broken line represents the relationship between the electrical angle and torque in the motor 19 of the present invention.

In the motor 19 of the present invention, the armature-winding connecting line 63 is led in such a way as to not form an extra length arcuately extending around or substantially straddling a part of any of the adjoining armature windings and to not intersect with the neutral-point connecting line Na. Therefore, the armature-winding connecting line 63 can be reduced in length and hence can have reduced electrical resistance, which should contribute to enhancement in the torque output performance of the motor 19.

However, there might arise effects due to the numbers of turns of the armature windings 53a-53i that differ among the adjoining portions of the windings 53a-53i. Thus, an experiment was conducted, through which the results of FIG. 9 were obtained. The results show that the motor 19 of the present invention, having effects of the shortened armature-winding connecting line 63 and the numbers of turns of the armature windings 53a-53i differing among the adjoining portions of the windings 53a-53, as a whole can achieve far better performance than the conventional motor.

Obviously, various minor changes and modifications of the present invention are possible in the light of the above teaching. It is therefore to be understood that within the scope of the appended claims the invention may be practiced otherwise than as specifically described.

What is claimed is:

1. An electric motor driven by three-phase electric power, comprising:
a rotor including a rotation shaft and a plurality of permanent magnets arranged circumferentially on an outer periphery of said rotation shaft; and
armature windings disposed adjacent to an outer periphery of said rotor, said armature windings being connected in series, via an armature-winding connecting line, for each of a plurality of groups of three or N circumferentially-adjoining poles, to thereby provide three-phase armature windings, wherein N is an arbitrary number equal to a multiple of three,
wherein the armature-winding connecting line, connecting in series said armature windings, is positioned so as not to substantially straddle a relatively great part of an outer periphery of any of adjoining ones of the armature windings, and wherein the armature-winding connecting line connects the adjoining armature windings of each of the three phases at one longitudinal end of the adjoining armature windings.

2. An electric motor as claimed in claim 1, which further comprises a neutral-point connecting line connecting respective neutral points of the three phases, and wherein the armature-winding connecting line and said neutral-point connecting line are positioned at opposite longitudinal ends of the armature windings.

3. An electric power steering apparatus comprising:
an electric motor driven by three-phase electric power to provide steering assist force to a steering system;
steering torque detecting means for detecting steering torque applied to a steering wheel; and
a control device for controlling said electric motor in accordance with at least a signal generated by said steering torque detection means,
said electric motor comprising:
a rotor including a rotation shaft and a plurality of permanent magnets arranged circumferentially on an outer periphery of said rotation shaft; and
armature windings disposed adjacent to an outer periphery of said rotor, said armature windings being connected in series, via an armature-winding connecting line, for each of a plurality of groups of three or N circumferentially-adjoining poles, to thereby provide three-phase armature windings, wherein N is an arbitrary number equal to a multiple of three,
wherein the armature-winding connecting line, connecting in series said armature windings, is positioned so as not to substantially straddle a relatively great part of an outer periphery of any of adjoining ones of the armature windings, and wherein the armature-winding connecting line connects the adjoining armature windings of each of the three phases at one longitudinal end of the adjoining armature windings.

4. An electric power steering apparatus as claimed in claim 3, which further comprises a neutral-point connecting line connecting respective neutral points of the three phases, and wherein the armature-winding connecting line and said neutral-point connecting line are positioned at opposite longitudinal ends of the armature windings.

5. An electric motor driven by three-phase electric power, comprising:
- a rotor including a rotation shaft and a plurality of permanent magnets arranged circumferentially on an outer periphery of the rotation shaft; and
- armature windings disposed adjacent to an outer periphery of the rotor, the armature windings being connected in series, via an armature-winding connecting line, for each of a plurality of groups of three or N circumferentially-adjoining poles, to thereby provide three-phase armature windings, wherein N is an arbitrary number equal to a multiple of three,
- wherein for each group, the armature-winding connecting line, connecting in series the armature windings, does not intersect itself, and
- a neutral-point connecting line connecting respective neutral points of the three phases, and wherein the armature-winding connecting line and the neutral-point connecting line are positioned at opposite longitudinal ends of the armature windings.

6. An electric motor as claimed in claim 5, wherein the armature-winding connecting line connects the adjoining armature windings of each of the three phases at one longitudinal end of the adjoining armature windings.

* * * * *